United States Patent [19]

Taleyarkhan

[11] Patent Number: 4,649,021
[45] Date of Patent: Mar. 10, 1987

[54] BWR FUEL ASSEMBLY WITH WATER FLOW MIXING CHAMBER AT FUEL BUNDLE/WATER CROSS ENTRANCE

[75] Inventor: Rusi P. Taleyarkhan, Pittsburgh, Pa.

[73] Assignee: Westinghouse Electric Corp., Pittsburgh, Pa.

[21] Appl. No.: 746,619

[22] Filed: Jun. 19, 1985

[51] Int. Cl.[4] .......................... G21C 3/32; G21C 15/00
[52] U.S. Cl. ..................................... 376/444; 376/352; 376/446
[58] Field of Search ........................ 376/352, 444, 446

[56] References Cited

U.S. PATENT DOCUMENTS

| | | |
|---|---|---|
| 3,235,463 | 2/1966 | Sankovich . |
| 3,349,004 | 10/1967 | Lass et al. . |
| 3,389,056 | 6/1968 | Frisch ................................. 376/352 |
| 3,802,995 | 4/1974 | Fritz et al. . |
| 3,878,870 | 4/1975 | Atherton et al. . |
| 4,076,586 | 2/1978 | Bideau et al. ........................ 376/352 |
| 4,348,355 | 9/1982 | Nylund . |
| 4,560,532 | 12/1985 | Barry et al. ........................ 376/444 |

FOREIGN PATENT DOCUMENTS 1150423 7/1983 Canada .

*Primary Examiner*—Harvey E. Behrend

[57] ABSTRACT

A BWR fuel assembly has a bundle of spaced fuel rods, an outer tubular flow channel surrounding the fuel rods so as to direct flow of coolant/moderator fluid along the fuel rods, and a hollow central water cross with a lower flow inlet end, an opposite upper flow outlet end and an open inner cruciform flow channel for subcooled moderator fluid flow through the fuel assembly. The water cross extends through the outer flow channel and is interconnected with the outer channel so as to divide it into separate compartments and the bundle of fuel rods into a plurality of mini-bundles thereof. Also, a pair of upper and lower tie plates are connected to the opposite ends of the fuel rods in each mini-bundle thereof so as to provide a separate fuel rod subassembly in each of the compartments. The tie plates have flow openings defined therethrough for allowing the flow of the coolant/moderator fluid into and from the separate fuel rod subassembly. The BWR includes an improvement which allows free cross flow of fluid between the lower ends of the respective fuel rod mini-bundles of the separate fuel rod subassemblies and in such manner minimizes maldistribution of flow between the mini-bundles. The improvement takes the form of a lower cross-shaped flow mixing chamber located between and extending upwardly from the lower tie plates of the mini-bundles and extending downwardly from the lower end of the water cross. Also, a plurality of axially spaced grids in each fuel rod subassembly maintain the fuel rods of its mini-bundle thereof in side-by-side spaced relationship, and the lower flow mixing chamber has an axial height less than the axial distance from the lower tie plate to the lowermost one of the axially spaced grids of each fuel rod subassembly.

7 Claims, 5 Drawing Figures

BWR FUEL ASSEMBLY WITH WATER FLOW MIXING CHAMBER AT FUEL BUNDLE/WATER CROSS ENTRANCE

CROSS REFERENCE TO RELATED APPLICATIONS

Reference is hereby made to the following copending applications dealing with related subject matter and assigned to the assignee of the present invention:

1. "Nuclear Fuel Assembly" by Robert F. Barry et al, assigned U.S. Ser. No. 368,555 and filed Apr. 15, 1982 (W.E. 50,013).

2. "Coolant Flow Paths Within A Nuclear Fuel Assembly" by Pratap K. Doshi, assigned U.S. Ser. No. 602,089 and filed Apr. 19, 1984, a continuation of U.S. Ser. No. 368,552, filed Apr. 15, 1982 and now abandoned (W.E. 50,105C).

3. "Water Tubes Arranged In Cross-Like Pattern In A Fuel Assembly" by Carl A. Olson et al, assigned U.S. Ser. No. 642,844 and filed Aug. 20, 1984 (W.E. 51,464).

4. "Cross Brace For Stiffening A Water Cross In A Fuel Assembly" by C. K. Lui, assigned U.S. Ser. No. 672,042 and filed Nov. 16, 1984 (W.E. 52,237).

5. "Improved Boiling Water Nuclear Reactor Fuel Assembly" by Rusi Taleyarkhan, assigned U.S. Ser. No. 729,602 and filed May 2, 1985, (W.E. 52,509).

BACKGROUND OF THE INVENTION

1. Field of the Invention

The present invention relates generally to fuel assemblies for a nuclear reactor and, more particularly, is concerned with a boiling water reactor (BWR) fuel assembly having a lower flow mixing chamber at the entrance to the fuel rod bundle and water cross which minimizes maldistribution of flow entering the separate mini-bundles making up the fuel rod bundle.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. Examples of such fuel assemblies are illustrated and described in U.S. Pat. Nos. 3,689,358 to Smith et al and 3,802,995 to Fritz et al and Canadian Pat. No. 1,150,423 to Anderson et al, as well as in the patent applications cross-referenced above.

In a fuel assembly of this type the fuel rods in the central region of the bundle thereof may be undermoderated and overenriched. In order to remedy this condition by increasing the flow of moderator water through this region of the assembly, several arrangements have been proposed. In the Fritz et al patent, one or more elongated empty rods are substituted for fuel rods in the central region of the assembly. In the above cross-referenced Olson et al patent application, water tubes are arranged in a cross-like pattern among the fuel rods in the assembly. In the Anderson et al patent, an elongated centrally-disposed stiffening device with vertical water passageways is used in the assembly. In the above cross-referenced Barry et al, Doshi and Lui patent applications, an elongated centrally-disposed water cross is used in the assembly.

As disclosed in the aforementioned latter three cross-referenced applications, the central water cross has a plurality of four radial panels which together form a cruciform water flow channel which divides the fuel assembly into four, separate elongated compartments, with the bundle of fuel rods being divided into mini-bundles disposed in the respective compartments. The water cross thus provides a centrally-disposed cross-shaped path for the flow of subcooled neutron moderator water within the channel along the lengths of, but separated from, adjacent fuel rods in the mini-bundles thereof.

The fuel rods of each mini-bundle extend in laterally spaced apart relationship between an upper tie plate and a lower tie plate and connected together with the tie plates comprises a separate fuel rod subassembly within each of the compartments of the channel. A plurality of grids axially spaced along the fuel rods of each fuel rod subassembly maintain the fuel rods in their laterally spaced relationships. The water cross has approximately the same axial length as the fuel rod subassemblies, extending between the upper and lower tie plates thereof.

As mentioned initially, coolant is passed along the fuel rods for removing heat therefrom. In the design of BWRs in the United States, subcooled water enters the bottom nozzle of the fuel assembly through a side entrance. Thereafter, the water is distributed upwardly into the four mini-bundles and the water cross. Typically, flow through the water cross is approximately 9 to 10 percent of flow through the fuel bundle. Due to the side entry characteristics of these BWRs, it has been found that significant maldistribution of flow results, That is, the difference in the mini-bundles entraining the highest and lowest mass flow rates is about 15 percent.

Maldistribution of flow can lead to several problems. First, an overall degradation of bundle critical power ratio (CPR) margin can result. Since water flowing in the mini-bundles cools the fuel rods thereof as it flows along their heated surfaces, the amount of water entering each mini-bundle determines its CPR characteristics. However, the overall bundle CPR margin is dictated by the CPR margin of the most limiting mini-bundle. Known relationships indicate that a 15 percent reduction in the mass flow rate in one of the mini-bundles leads to a CPR margin degradation of about 7 percent which is potentially quite problematic.

Second, since ventilation holes or flow communication openings have been provided at the outer vertical edges of the watercross panels at several axial locations, the 15 percent flow maldistribution between the mini-bundles also leads to transverse pressure gradients, causing cross-flow jets of water. Depending on these gradients, the jets could conceivably cause structural vibrations. The presently existing unavailability of adequate analytical/computational tools to evaluate the thermal-hydraulic-mechanical impact of such a situation leads to further uncertainies in estimating mini-bundle CPR margins, with consequent operational and licensing problems.

Third, while flow boiling typically starts after the first few feet of heated length in a BWR bundle, the presence of flow maldistritution of the magnitude mentioned above would tend to cause or initiate the boiling process at different axial locations in each mini-bundle. This disparity causes a net disparity in the amount of void generated for each mini-bundle which indicates improper neutron utilization or moderation.

Consequently, the need exists for further improvement of the BWR fuel assembly so as to eliminate or significantly minimize mini-bundle inlet flow maldistribution and thereby avoid the undesirable effects which accompany this condition.

SUMMARY OF THE INVENTION

The present invention provides a modification which is designed to satisfy the aforementioned needs. Underlying the present invention is the observation that in fuel assemblies without the water cross structure, inlet flow maldistribution decays off exponentially within the first few inches (approximately six inches to one foot) to a low value.

This observation lead to the relatively simple solution to the maldistribution problem provided by the present invention: allow free mixing at the entrance to the mini-bundles by eliminating the physical separation thereof by the water cross. Instead of starting at the lower tie plate as heretofore, the water cross begins at a location spaced a short distance above the lower tie plate, such as within the range of six inches to one foot. This simple modification provides a free flow mixing chamber in the entrance region of the fuel bundle, thereby minimizing or eliminating to a large extent any flow maldistribution and the related undesirable effects. The relative impact of this simple design modification on thermal-hydraulic, neutronic, structural and LOCA margin characteristics has been shown to be largely positive in nature.

Accordingly, the present invention sets forth an improved feature in a BWR fuel assembly. The fuel assembly includes a bundle of elongated fuel rods disposed in side-by-side relationship so as to form an array of spaced fuel rods, an outer tubular flow channel surroundng the fuel rods so as to direct flow of coolant/moderator fluid along the full rods, and a hollow water cross extending centrally through and interconnected with the outer flow channel so as to divide the channel into separate compartments and the bundle of fuel rods into a plurality of mini-bundles thereof being disposed in the respective compartments. The improved feature of the fuel assembly comprises means defining a flow mixing chamber between lower end portions of the mini-bundles of fuel rods and below the water cross which minimizes maldistribution of flow between the respective mini-bundles. The mixing chamber is generally centrally-located in a lower portion of the outer flow channel and has a generally cross-like transverse cross-sectional shape.

More particularly, the mixing chamber defining means includes a lower end of the water cross and lower ends of the respective mini-bundles, with the water cross lower end being located between and spaced above the mini-bundle lower ends. A plurality of axially spaced grids are used to maintain the fuel rods of each mini-bundle in side-by-side spaced relationship. The lower flow mixing chamber has an axial height less than the axial distance from the lower ends of the respective mini-bundles to the lowermost one of the axially spaced grids of each mini-bundle.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
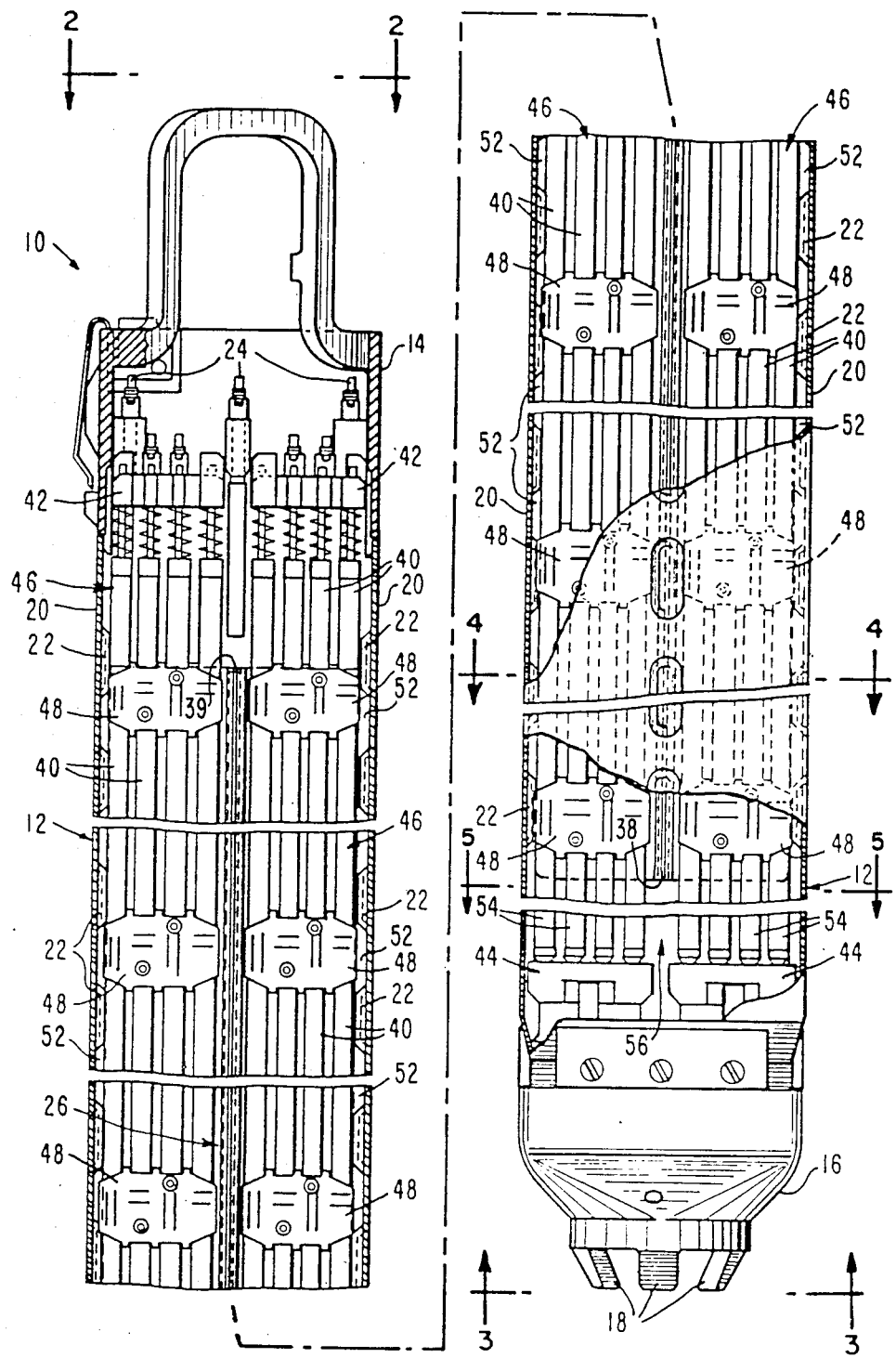
FIG. 1 is an elevational view, with parts broken away and sectioned for clarity, of a BWR nuclear fuel assembly in which the improved feature of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
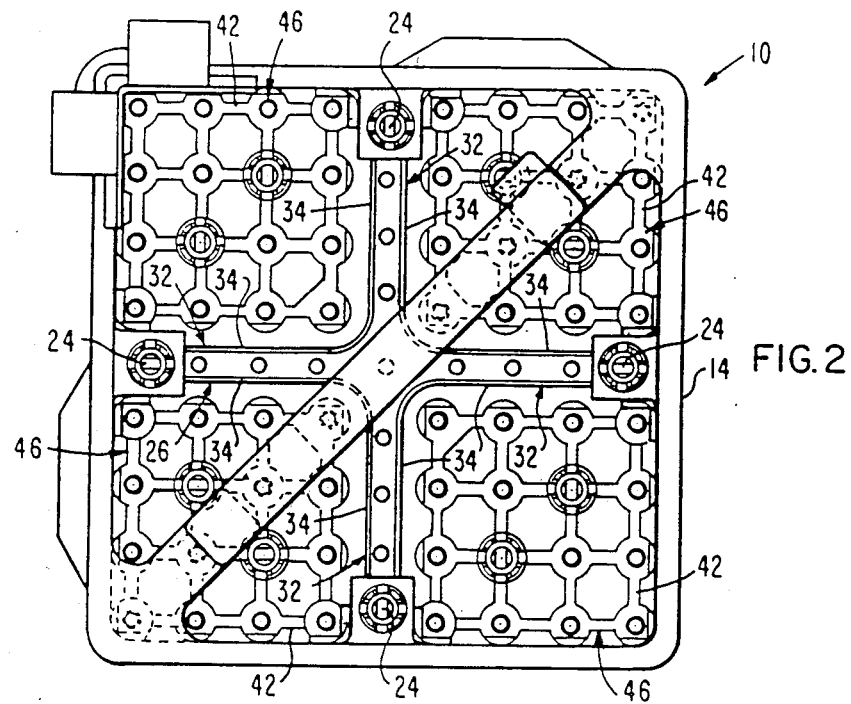
FIG. 2 is an enlarged top plan view of the fuel assembly as seen along line 2—2 of FIG. 1.
Figure 3:
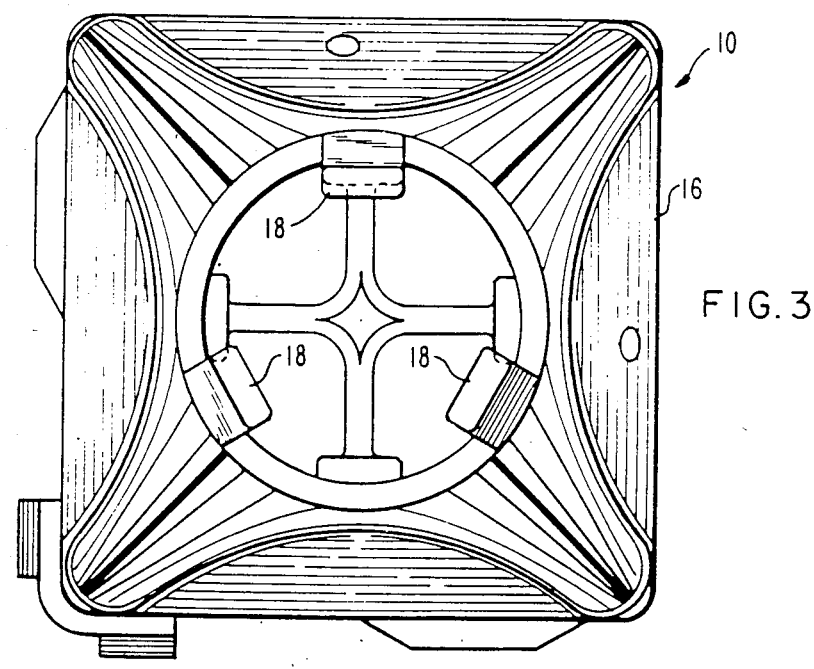
FIG. 3 is an enlarged bottom plan view of the fuel assembly as seen along line 3—3 of FIG. 1.

Referring now to the drawings, and particularly to FIGS. 1 to 3, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 (also see FIGS. 4 and 5) generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
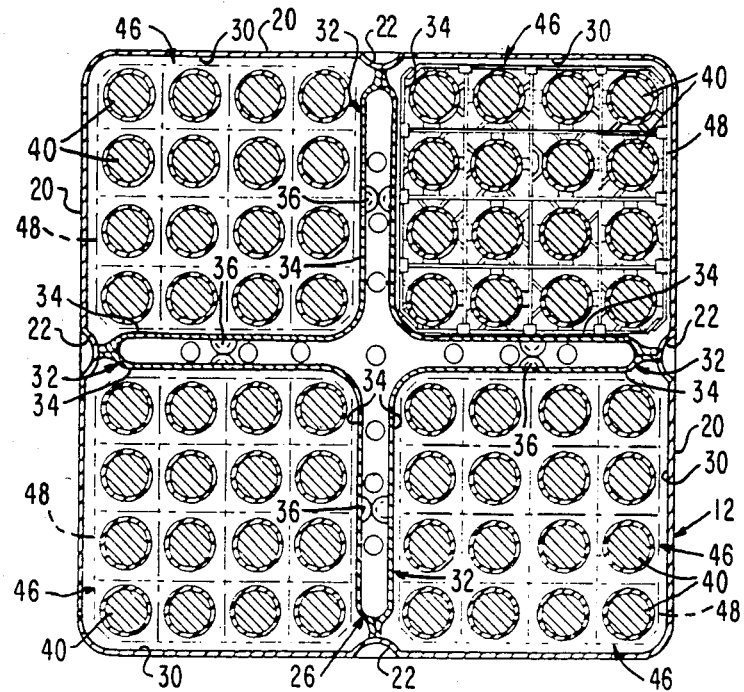
FIG. 4 is a cross-sectional view of the fuel assembly taken along line 4—4 of FIG. 1, showing the fuel rod bundle of the fuel assembly being separated into separate mini-bundles by the water cross with a grid surrounding one of the mini-bundles being shown in full, while the grids surrounding the other three mini-bundles are shown in outline form.

For improving neutron moderation and economy, a hollow water cross, as seen in FIGS. 1, 2 and 4 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally-L shaped, metal angles or sheet members 34 that extend generally along the entire length of the channel 12, except for the improved feature of the present invention to be described below. The sheet members 34 of each panel 32 are interconnected and spaced apart by a series of elements in the form of dimples 36 formed therein and extending therebetween. The dimples 36 are formed in and disposed in a vertical column (not shown) along the axial length of the sheet members 34. Preferably, the dimples 36 in each of the sheet members 34 are laterally and vertically aligned with corresponding dimples 36 in adjacent sheet members 34 in order to provide pairs of opposed dimples that contact each other along the lengths of the sheet members to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated lateral ends of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 38 and an opposite upper flow outlet end 39 which each communicate with the inner channel 28 for providing subcoolant flow therethrough.

Disposed within the channel 12 is a bundle of fuel rods 40 which, in the illustrated embodiment, number sixty-four and form an 8×8 array. The fuel rod bundle is, in turn, separated into four mini-bundles thereof by the water cross 26. The fuel rods 40 of each mini-bundle, such being sixteen in number in a 4×4 array, extend in laterally spaced apart relationship between an upper tie plate 42 and a lower tie plate 44. The fuel rods in each mini-bundle are connected to the upper and lower tie plates 42,44 and together therewith comprise a separate fuel rod subassembly 46 within each of the compartments 30 of the channel 12. A plurality of grids 48 axially spaced along the fuel rods 40 of each fuel rod subassembly 46 maintain the fuel rods in their laterally spaced relationships. The lower and upper tie plates 44,42 of the respective fuel rods subassemblies 46 have flow openings 50 defined therethrough for allowing the flow of the coolant/moderator fluid into and from the separate fuel rod subassembly. Also, coolant flow paths provide flow communication between the fuel rods subassemblies 46 in the respective separate compartments 30 of the fuel assembly 10 through a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the Doshi application cross-referenced above, and have been discussed in sufficient detail herein to enable one skilled in the art to understand the improved feature of the present invention presented hereinafter. For a more detailed description of the construction of the BWR fuel assembly, attention is directed to both of the above cross-referenced Barry et al and Doshi patent applications.

Free Flow Mixing Chamber at Fuel Bundle Entrance

Figure 5:
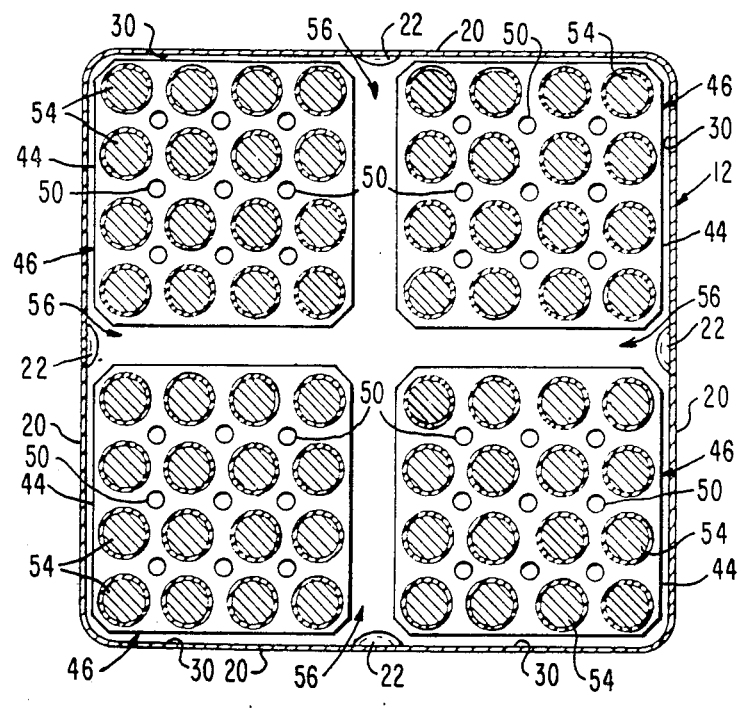
FIG. 5 is another cross-sectional view of the fuel assembly similar to that of FIG. 4, but taken along line 5—5 of FIG. 1 in order to show the free flow mixing chamber between the mini-bundles at the entrance of the fuel bundle.

Referring now to FIGS. 1 and 5, there is seen the feature incorporated in the BWR fuel assembly 10 which allows free cross flow of fluid between the lower ends 54 of the respective fuel rod mini-bundles of the separate fuel rod subassemblies 46 and in such manner minimizes maldistribution of flow between the mini-bundles. The improvement takes the form of a lower cross-shaped flow mixing chamber, generally designated 56, defined by the lower end 38 of the water cross 26, the respective lower ends 54 of the mini-bundles and the lower tie plates 44 connected thereto. The water cross lower end 38 has been modified such that it is located in spaced relationship above the lower tie plates 44.

The lower end 38 of the water cross 26 is located at an axial elevation spaced above that of each fuel rod subassembly lower tie plate 44 and below the lowermost grid 48 of the subassembly 48 but, as shown in FIG. 1, closer to the lowermost grid than to the lower tie plate. Specifically, the lower end 38 of the water cross 26 is within the range of about six inches to one foot above the lower tie plates 44.

More particularly, the flow mixing chamber 56 is located between and extends upwardly from the lower tie plates 44 of the mini-bundles and extends downwardly from the lower end 38 of the water cross 26. As seen in FIG. 5, the flow mixing chamber 56 is generally centrally-located in a lower portion of the outer flow channel 12 and has a generally cruciform or cross-like transverse cross-sectional shape. Also, as depicted in FIG. 1, the lower flow mixing chamber 56 has an axial height less than the axial distance from the lower tie plates 44 to the lowermost one of the axially spaced grids 48 of the respective fuel rod subassembly 46.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a fuel assembly having a bundle of elongated fuel rods disposed in side-by-side relationship so as to form an array of spaced fuel rods, an outer tubular flow channel surrounding said fuel rods so as to direct flow of coolant/moderator fluid along said fuel rods, and a hollow water cross extending centrally through and interconnected with said outer flow channel so as to divide said channel into separate compartments and said bundle of fuel rods into a plurality of mini-bundles thereof being disposed in said respective compartments, the improvement which comprises:

means defining a flow mixing chamber within and between lower end portions of said mini-bundles of fuel rods and below said water cross which allows free mixing cross flow within and between said lower end portions of said respective mini-bundles, said mixing chamber defining means including an upper limit constituted by a lower end of said water cross and a lower limit constituted by lower ends of said respective mini-bundles, said water cross lower end being spaced within the range of about six to twelve inches above said mini-bundle lower ends.

2. The fuel assembly as recited in claim 1, wherein said chamber is generally centrally-located in a lower portion of said outer flow channel.

3. The fuel assembly as recited in claim 1, wherein said chamber has a generally cross-like transverse cross-sectional shape.

4. The fuel assembly as recited in claim 1, wherein said mixing chamber is located between and extending upwardly from said lower ends of said mini-bundles and extending downwardly from said lower end of said water cross.

5. In a fuel assembly having a bundle of elongated fuel rods disposed in side-by-side relationship so as to form an array of spaced fuel rods, an outer tubular flow channel surrounding said fuel rods so as to direct flow of coolant/moderator fluid along said fuel rods, a hollow water cross extending centrally through said outer flow channel, said water cross having a lower flow inlet end, an opposite upper flow outlet end and an open inner cruciform flow channel for subcooled moderator fluid flow through said fuel assembly and being interconnected with said outer flow channel so as to divide said channel into separate compartments and said bundle of fuel rods into a plurality of mini-bundles thereof, and a pair of upper and lower tie plates connected to the opposite ends of said fuel rods in each mini-bundle thereof so as to provide a separate fuel rod subassembly in each of said compartments, said tie plates having flow openings defined therethrough for allowing the flow of said coolant/moderator fluid into and from said separate fuel rod subassembly, said each fuel rod subassembly including a plurality of axially spaced grids for maintaining said fuel rods of its mini-bundle thereof in side-by-side spaced relationship, the improvement which comprises:

said inlet end of said water cross being located at an axial elevation spaced above that of each fuel rod subassembly lower tie plate and below said lowermost grid of said subassembly but closer to said lowermost grid than to said lower tie plate so as to define a lower flow mixing chamber which allows free cross flow within and between lower end portions of said respective mini-bundles of fuel rods of said separate fuel rod subassemblies.

6. The fuel assembly as recited in claim 5, wherein said lower flow mixing chamber has an axial height less than the axial distance from said lower tie plate to said lowermost one of said axially spaced grids of said each fuel rod subassembly but at least about six inches above said lower tie plate.

7. The fuel assembly as recited in claim 6, wherein said chamber is generally centrally-located in a lower portion of said outer flow channel and has a generally cruciform transverse cross-sectional shape.

* * * * *